United States Patent [19]

Huang et al.

[11] 4,225,458
[45] Sep. 30, 1980

[54] PROCESS FOR THE CONTINUOUS MANUFACTURE AND SEPARATION OF OXO CATALYSTS

[75] Inventors: I-Der Huang, West Paterson; Catherine McCooey, North Brunswick, both of N.J.

[73] Assignee: Exxon Research & Engineering Co., Florham Park, N.J.

[21] Appl. No.: 7,681

[22] Filed: Jan. 30, 1979

[51] Int. Cl.³ .......................... B01J 31/40; B01J 31/04; C07C 45/12; C07C 27/22
[52] U.S. Cl. ........................... 252/413; 252/412; 252/414; 252/431 C; 260/413; 260/414; 568/883; 568/909; 568/451
[58] Field of Search ........... 252/412, 413, 414, 431 C; 568/883, 909; 260/413 HC, 413 S, 414, 604 HF

[56] References Cited

U.S. PATENT DOCUMENTS

| | | | |
|---|---|---|---|
| 2,802,846 | 8/1957 | Mertzweiller | 568/883 |
| 3,234,146 | 2/1966 | Null et al. | 252/413 |
| 3,246,024 | 4/1966 | Gwynn et al. | 260/604 HF |

Primary Examiner—P. E. Konopka
Attorney, Agent, or Firm—Rebecca Yablonsky

[57] ABSTRACT

Contacting the saponified heavy oxygenated bottoms product obtained from an oxo distillation unit with demet water containing a cobaltous compound in a continuous flow, preferably countercurrent extractor results in the efficient production of an oil-soluble cobalt catalyst on a continuous basis.

9 Claims, 1 Drawing Figure

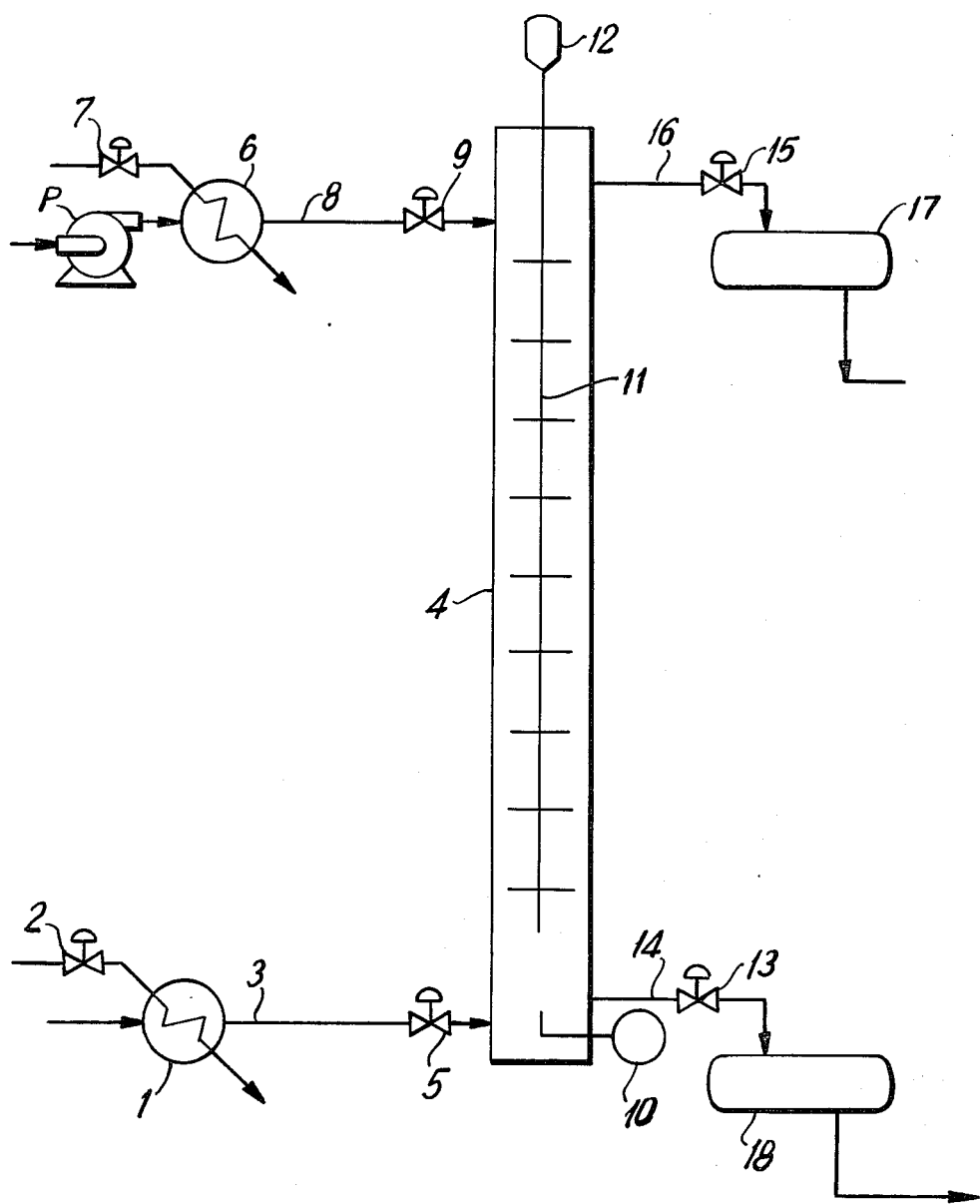

PROCESS FOR THE CONTINUOUS MANUFACTURE AND SEPARATION OF OXO CATALYSTS

BACKGROUND OF THE INVENTION

1. Field of the Invention

The present invention relates to the preparation of catalysts employed in hydroformylating olefins in the presence of carbon monoxide and hydrogen at elevated temperatures and pressures in order to produce aldehydes which are converted by hydrogenation to alcohols. More particularly, it pertains to a novel process for the continuous synthesis of oxo catalysts by employing an extraction mechanism at a much reduced cost.

The oxo process is well known and involves the preparation of oxygenated organic compounds by the reaction of carbon monoxide and hydrogen (synthesis gas) with carbon compounds containing olefinic linkages in the presence of a carbonylation catalyst at hydroformylation conditions which include synthesis gas pressures of 1500 to 4500 psig and temperatures in the range of 150°–450° F.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and triisobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired. $C_5$ to $C_{13}$ olefins are commonly used olefin starting materials.

2. Description of the Prior Art

Typically, in a cobalt-catalyzed oxo process, the catalyst material is fed into the oxonation reactor in the form of an oil-soluble soap, e.g., cobalt oleate. Such a cobalt soap is then converted in situ to cobalt tetracarbonyl hydride or cobalt hydrocarbonyl, which is presumed to be the catalytically active species. After the oxonation, said cobalt hydrocarbonyl, $HCo(CO)_4$, is normally separated from the oxo product by way of the following demetalling process:

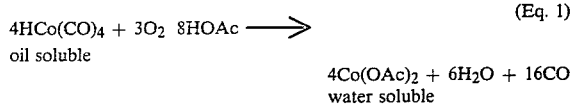

This conversion of oil-soluble/water-insoluble cobalt hydrocarbonyl to water-soluble/oil-insoluble cobalt acetate makes it possible to separate the cobalt catalyst from the oxo product stream and recover the cobalt as cobaltous ion, $Co^{+2}$. The aqueous layer which contains the cobaltous compound, e.g., cobalt acetate, is called demetalling water or, briefly, demet water.

In general, this demet water is neutralized with caustic and thereafter reacted with a high molecular weight carboxylic acid, e.g., oleic acid to form an oil-soluble cobalt soap, e.g., cobalt oleate which is extracted by olefin, as represented by the following equations:

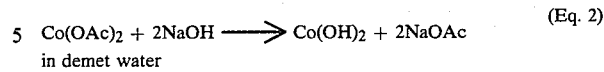

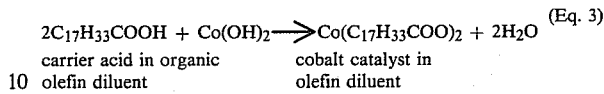

The cobalt soap so formed is further diluted with the olefinic feed before it is fed to the oxonation reactor and waste water is sent to disposal.

There are a number of deficiencies associated with this conventional catalyst synthesis cycle. First, it has been discovered that the cobalt hydroxide formed in Equation 2 tends to cause the formation of emulsions, which necessitates the use of a batch reactor with stirring at a critical rate in the synthesis of the cobalt soap. Secondly, in order to minimize the emulsion or precipitation of the cobalt hydroxide, it is necessary to maintain the reaction medium within a narrow, neutral range, e.g., $pH=6.5-7.5$, with constant and vigorous stirring. If the pH of the soap synthesis mixture is lower than the neutral range, i.e., acidic, a lesser amount of cobalt soap would be recovered in Equation 3; and if the pH goes higher, then a higher level of emulsion or precipitation of cobalt would result. In either event, the system is highly susceptible of sizable cobalt loss and severe pollution problems. Thirdly, in this conventional catalyst cycle, the high cost high molecular weight carboxylic acids, e.g., oleic acid, employed as the catalyst carrier, are normally discarded after a single cycle. This limited usage of carrier acid coupled with the use of acetic acid and caustic on a once-through basis makes the conventional method economically disadvantageous.

Attempts have been made to ameliorate the above-mentioned deficiencies. In U.S. Pat. No. 3,234,146 to Null et al, the crude oxo product is demetalled by treating it with a mineral acid such as nitric; the oxo product is then saponified and the alkali soap is extracted with water into an aqueous phase. The aqueous inorganic salts of cobalt and manganese are caused to react with the aqueous alkaline soap in the presence of a heavy alcohol to form the Co and Mn soaps. When operating in this manner, the patentees have found that there is a restrictive requirement in that the synthesis of the cobalt-manganese soap must be carried out in a well stirred batch reactor at a pH in the range of from 7 to 9. Accordingly, this process does not provide the continuous synthesis of the catalyst soap needed to debottleneck the entire oxo process. In addition, it is still subject to close pH control of the catalyst synthesis system.

SUMMARY OF THE INVENTION

Now, the novel process of the present invention is capable of greatly ameliorating the limitations discussed above by employing the following major steps: (a) demetalling the crude oxo product under conventional demetalling conditions by contacting the crude oxo produce in the presence of oxygen or air with an excess of an aqueous organic acid such as acetic acid, in order to convert oil-soluble/water-insoluble cobalt hydrocarbonyl to a water-soluble/oil-insoluble cobaltous compound, e.g., a cobalt carboxylate; (b) separating the demet water containing said cobaltous compound from the demetalled oxo product; (c) saponifying the heavy oxygenated fraction (HOF) bottoms from the distillation unit of the demetalled, hydrogenated oxo product with an alkaline material such as aqueous caustic, limestone, etc., to form a soap; and (d) contacting the demet water separated in step (b) with said soap derived from the HOF bottoms in step (c) in a continuous flow, preferably countercurrent extractor to produce a cobalt soap, e.g., cobalt oleate.

The use of said HOF bottoms entails a drastic reduction in the consumption of catalyst carrier, e.g., oleic acid. By HOF bottoms is meant those high-boiling by-products such as esters, acids, acetals and the like recovered as the bottoms product from the alcohol distillation stage in the working up of the oxonated material. A typical composition of the HOF bottoms, as disclosed in U.S. Pat. No. 2,802,846 issued to Mertzweiller in 1957, is given in Table I.

TABLE I

COMPOSITION OF THE BOTTOMS PRODUCT FOR A $C_7 =$ OXO SYSTEM

| Component | Concentration (wt. %) |
|---|---|
| $C_8$—$C_9$ alcohol | 5 |
| $C_{16}$ ether | 33 |
| $C_{16}$ alcohol and/or carbonyl compound | 30 |
| $C_{22}$ ester | 10 |
| $C_{24}$ acetal | 22 |

These esters and acids present in the HOF bottoms are treated with an alkaline solution, e.g., aqueous caustic, in a sufficient amount to yield their corresponding alkaline soaps, as illustrated in the following equation:

(Eq. 4)

where R, R' and R" denote alkyl groups. The unreactive portion of HOF such as ethers, etc., and formed R"OH are good solvents for the alkali soaps and serve as soap solvent medium. This saponification may be carried out at a temperature ranging from about 50° to about 300° C., preferably from about 65° to about 250° C., and more preferably from about 65° to about 200° C. Pressure is not critical and suitably may be in the range of about atmospheric to about 200 psig.

The thrust of the present invention resides in the next step: a novel combination of ion exchange reaction and extraction between the cobaltous compound contained in the demet water and the metallic salts of certain components in the HOF bottoms conducted in a continuous flow, countercurrent extractor. This ion exchange/extraction process can be illustrated as follows:

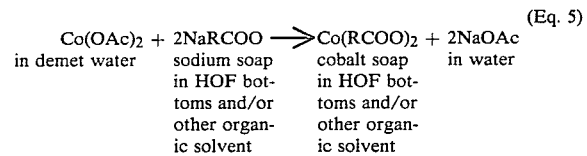
(Eq. 5)

The use of an extraction unit makes it possible to carry out simultaneously the cobalt soap synthesis and its extraction practically without any need to control the pH. This ion exchange/extraction process is preferably conducted at an elevated temperature ranging from about 200° to about 25° C., more preferably from about 120° to about 40° C., and more preferably from about 95° to about 40° C. Pressure is not critical and suitably may range from about atmospheric to about 200 psig. In addition, the aqueous phase exiting from one end of the extractor contains a very low level of cobalt, if any, e.g., less than 10 ppm, thereby minimizing cobalt loss and also alleviating the environmental concern. Cocurrent operation may alternatively be used to achieve the continuous process but would require several separate extraction stages.

The solubility of sodium soap decreases with decreasing pH. However, the solubility of the sodium soap in the aqueous phase in the above reaction (Eq. 5) at any given pH is lower than theoretical due to a common ion effect caused by the sodium acetate. Thus, the solubility of sodium oleate in water is reported to be 10% at 25° C. but at a pH of 9–9.5 it would be 0.01 wt. % with 1.0 wt. % sodium acetate. A visual inspection of the aqueous products shows they are all clear indicating low soap concentration. This assists in the soap forming acid values in the HOF being substantially completely recovered as cobalt soap in the organic phase product.

BRIEF DESCRIPTION OF DRAWING

The present invention can be better understood by reference to the attached drawing which illustrates the subject continuous extraction process for the manufacture and separation of a cobalt soap. The extraction column employed may be either multi-staged or packed.

DETAILED DESCRIPTION

The saponified HOF bottoms may be fed through heat exchanger 1 controlled by temperature control valve 2, via line 3, into the bottom of the extraction column 4 at a specified rate, e.g., 18 gm./min., controlled by flow control valve 5. The demet water feed is preferably pretreated with an alkaline solution, e.g., 50% NaOH solution, in order to neutralize the excess of, e.g., acetic acid which may be present in the demet water. The demet water, with neutralization up to, e.g., about 80%, or without such pre-neutralization, is fed through heat exchanger 6 controlled by temperature control valve 7 via line 8 at a desired rate, e.g., 100 gm/min., controlled by flow control valve 9 to the top of the column using, e.g., a Whitey pump P. Both feeds are preferably preheated to a favorable reaction temperature, e.g., 65° C. The extraction column is also preferably maintained at a constant temperature, e.g., 65° C., by employing a suitable device, e.g., a hot water jacket (not shown) and is provided with pH indicator 10.

The unit can be started by introducing both feeds simultaneously until the column is filled, with continuous agitation by means of the agitator 11 actuated by motor 12. When the top product, e.g., catalyst soap, begins coming off the column, the product rates are adjusted by means of liquid level control valve 13 in aqueous effluent line 14 and liquid level control valve 15 in catalyst product line 16 such that the aqeuous and the organic stream flow rates through the column remain constant, thus achieving and maintaining a steady state. When steady state is achieved, the catalyst product is taken off as the top product via line 16 and passed to settling tank 17 and the aqueous product as the bottom product via line 14 and passed to settling tank 18.

The following examples further illustrate the present invention.

EXAMPLE 1-A

All runs were continuous and were made using a 3-inch internal diameter by 4 feet height glass York Scheibel extractor containing 36 one-inch baffled compartments and a six inch settling zone at top and bottom ends. The extractor is equipped with a variable speed agitator and a glass jacket.

Saponified HOF bottoms (SHB) containing a mixture of sodium soap and caustic soda was fed into the bottom of the column at a desired rate. Demet water containing 0.5-0.9 wt. % cobalt was fed at the specified rate to the top of the column. Both feeds were preheated to the extraction temperature. Typical analyses of feeds are shown in Table II below.

TABLE II

| Feed | Source | Analysis Wt. % | Other Analyses |
|---|---|---|---|
| (1) SHB | Oxonation of $C_9$ olefins | Na-3.3 total 3.10 as soap 0.55 as NaOH | 10.8% $H_2O$ |
| (2) SHB | Oxonation of $C_8$ and $C_9$ olefins | Na-1.95 total 1.88 as soap 0.07 as NaOH | 6.6% $H_2O$ |
| (3) Demet $H_2O$ #1 | Commercial sample | Co - 0.55 | pH 4.55 1.6% HOAC |
| (4) Preneutralized Demet $H_2O$ | Demet $H_2O$ #1 preneutralized with NaOH to remove 90% HOAC | Co - 0.538 | 0.16% HOAC |
| (5) Demet $H_2O$ #2 | Commercial Sample | Co: 0.71 | pH 4.5 0.7% HOAC |
| (6) Preneutralized Demet $H_2O$ | Demet $H_2O$ #2 neutralized with NaOH to remove 91% HOAC | Co: 0.70 | 0.7% HOAC |
| (7) Demet $H_2O$ #3 | Commercial material | Co: 0.64 | pH 4.5 0.9% HOAC |

EXAMPLE 1-B

This example illustrates the capability of the present invention to recover cobalt completely from an aqueous solution via the subject novel ion exchange reaction/extraction process.

Feeds #1 and #4 were fed respectively at 18 and 100 grams/minute to the extractor as described in Example 1-A at 65° C. The theoretical soap to cobalt ratio was about 130%. The cobalt in the demet stream was successfully removed to less than 10 ppm after about 90 minutes operation while the cobalt soap-organic product containing a desirable cobalt content for the oxonation reaction and with exceptionally low content of sodium (Na to Co ratio 0.003 or less), was continuously produced and was free of emulsion formation. Typical analyses of samples taken during the run are given in Table III below.

TABLE III

| Sample at time | Aqueous Product (Waste Stream) | | | Organic Product (cobalt soap) | | |
|---|---|---|---|---|---|---|
| Min. | gm/min. | pH | Co ppm | gm/min. | Co Wt. % | Na/Co |
| 90 | 102 | 8.0 | 28 | 19 | 3.06 | 0.003 |
| 210 | 104 | 8.0 | 6 | 17 | 3.00 | — |
| 300 | — | 9.3 | 2 | — | 2.88 | 0.001 |
| 390 | 100 | 9.2 | 1 | 19 | 3.02 | — |
| 420 | 100 | 9.2 | 1 | 18 | 3.02 | 0.001 |

The data show how low the cobalt content of the waste stream is.

EXAMPLES 2-5

These examples illustrate that the present invention has a wide range of operating conditions. pH and temperature changes have no effect on the process operability. Feeds #2 and #6 were used for the continuous reaction/extraction runs. Preneutralized demet water (#6) was fed at a constant rate of about 100 gm/min. Rates of saponified HOF bottoms were varied (40-60 gm/min) for each run to achieve pH changes. Table IV shows the results obtained.

TABLE IV

| Example No. | Temp. °C. | Duration of Continous Run, min. | Aqueous Product pH | Aqueous Product Co ppm | Organic Product Co Wt. % | Organic Product Na/Co |
|---|---|---|---|---|---|---|
| 2 | 65 | 265 | 10.1 | 1 | 1.41 | 0.003 |
| 3 | 85 | 245 | 9.2 | 11 | 1.33 | 0.003 |
| 4 | 54 | 330 | 8.3 | 1 | 1.42 | 0.006 |
| 5 | 85 | 335 | 12.0 | 0.4 | 1.10 | 0.007 |

Note that Example 5 was operated and maintained at a pH as high as 12 and no emulsion was formed. This is surprising and unexpected in view of the fact that with $CO^{++}$ in the demet water amd excess caustic in the saponified HOF bottoms, one might expect the formation of $Co(OH)_2$ (see Equation 2) and of emulsions, to occur. Thus it has been confirmed experimentally that the process is quite insensitive to changes in pH. Consequently, the former prejudice against using any mode of operation other than batch operation, apparent in the prior art, has been overcome.

EXAMPLES 6-7

These examples illustrate that no pre-neutralization of demet water is required for operating the extraction/reaction process of the present invention. Continuous runs were carried out at 65° C. in a manner similar to that of Example 1-B except that the saponified HOF bottoms of Feed #2 was used. Rate of SHB was maintained at 65-70 gm/min. Results (200-minute samples) are given in Table V below.

TABLE V

| Example | Demet Water - Source | Rate gm/min. | Aqueous Product pH | Aqueous Product Co ppm | Organic Product Co Wt. % | Na/Co |
|---|---|---|---|---|---|---|
| 6 | Feed #7 pre-neutralized with NaOH to remove 90% HOAC | 160 | 9.5 | 18 | 1.2 | 0.005 |
| 7 | Feed #7 | 100 | 8.5 | 0.4 | 0.92 | 0.02 |

EXAMPLE 8

This example illustrates the saponification of various oxo HOF bottoms to yield products suitable for the extraction/reaction process. Oxo HOF bottoms, a mixture of high boiling organic compounds, contains certain amounts of acid which are bound as esters. This mixture, discharged from the oxo alcohols distillation tower at 175°-260° C., is cooled and saponified at 120° C. and 80 psi with a 26% caustic solution in a 650 gallon reaction. The saponification reaction is carried out continuously. The reaction is second order kinetic with a rate constant of $0.078 \times 10^{-3}$ (lb. mole ester)/(lb. total feed) (min.) at 120° C. Excess amounts of caustic at 150% theory are used to expedite the saponification. The product after reaction is discharged to a settler in which the aqueous solution containing about 10% caustic is separated (bottom layer) and transferred to a storage tank. This portion of material is used for preneutralizing demet water employed in the cobalt catalyst extraction/reaction process step.

The organic phase containing sodium soap and 2-10% water, is held up in the SHB product storage tank. Depending upon the grade of alcohol being manufactured, concentration of sodium soap may vary from 20 to 60%. The material can be used as is for the extraction/reaction step.

Table VI illustrates typical feed and product rates for various oxo HOF bottoms.

What is claimed is:
1. A process for the manufacture and separation of oxo cobalt containing catalysts which comprises the steps of:
    (a) demetalling the crude oxo product by contacting it in the presence of oxygen or air with an excess of an aqueous organic acid to convert cobalt to cobatons compound;
    (b) separating the demet water containing the resulting cobaltous compound from the demetalled oxo product;
    (c) saponifying the heavy oxygenated fraction (HOF) bottoms which contains alcohols, ethers, acids, esters and acetals from the distillation of demetalled, hydrogenated oxo product with an alkaline material to form a soap; and
    (d) contacting the demet water separated in step (b) with said saponified HOF bottoms obtained in step (c) in a continuous flow extractor to produce a cobalt soap, the pH of the aqueous effluent from the extractor being in the range of about 8 to about 12.
2. The process according to claim 1 in which in step (d) the contacting is carried out countercurrently.
3. The process according to claim 1 or claim 2 in which in step (a) the aqueous organic acid is acetic acid.
4. The process according to claim 1 or claim 2 in which the demet water is pre-neutralized so as to neutralize part of the acid it contains.
5. The process according to claim 4 in which the demet water is pre-neutralized so as to neutralize up to about 80% of the acid it contains.
6. The process according to claim 1 in which in step (c) aqueous caustic is used in excess.
7. The process according to claim 6 in which the saponified material after reaction is allowed to settle and an aqueous caustic layer is separated.
8. The process according to claim 7 in which the separated caustic layer is used to neutralize demet water partially before it is passed to the extractor.
9. The process according to claim 1 wherein the HOF bottoms is obtained from the oxonation of olefins in the range of $C_5$ to $C_{13}$.

* * * * *

TABLE VI

| | HOF Feed | | 26% Caustic Feed K lb/day | Organic Soap Product | | Aqueous Product |
|---|---|---|---|---|---|---|
| Grade** | Total K** lb/day | As esters K lb/day | | Total K lb/day | As soap K lb/day | Total K lb/day |
| $C_8$ | 18.3 | 8.27 | 6.96 | 18.75 | 7.34 | 7.01 |
| $C_9$ | 17.8 | 6.27 | 5.30 | 17.83 | 5.68 | 5.27 |
| $C_{10}$ | 29.9 | 8.31 | 7.12 | 30.12 | 7.41 | 6.99 |
| $C_{13}$ | 35.4 | 7.15 | 6.23 | 35.62 | 6.40 | 6.01 |

*Carbon Number of Oxo alcohols
**K - multiplication factor of 1000